US011962555B1

(12) United States Patent
Tewes et al.

(10) Patent No.: US 11,962,555 B1
(45) Date of Patent: Apr. 16, 2024

(54) KEEP SELECT MESSAGES IN NETWORKED GROUP CONVERSATION THREADS

(71) Applicant: WhatsApp LLC, Menlo Park, CA (US)

(72) Inventors: Isabel Tewes, Los Angeles, CA (US); Steven Zimmerman, Hoboken, NJ (US); Sudheer Kumar Peddireddy, Round Rock, TX (US); Bruno Soares, Medfield, MA (US)

(73) Assignee: WhatsApp LLC, Menlo Park, CA (US)

( * ) Notice: Subject to any disclaimer, the term of this patent is extended or adjusted under 35 U.S.C. 154(b) by 0 days.

(21) Appl. No.: 18/045,392

(22) Filed: Oct. 10, 2022

Related U.S. Application Data

(60) Provisional application No. 63/359,171, filed on Jul. 7, 2022.

(51) Int. Cl.
*H04L 51/216* (2022.01)
*H04L 51/10* (2022.01)
*H04L 51/212* (2022.01)

(52) U.S. Cl.
CPC ............ *H04L 51/216* (2022.05); *H04L 51/10* (2013.01); *H04L 51/212* (2022.05)

(58) Field of Classification Search
CPC ... H04L 51/216; H04L 51/234; H04L 51/224; H04L 51/212; H04L 51/10; H04L 51/21
USPC .................................................. 709/201–206
See application file for complete search history.

(56) References Cited

U.S. PATENT DOCUMENTS

| | | | | |
|---|---|---|---|---|
| 9,294,425 | B1 * | 3/2016 | Son | H04L 51/18 |
| 9,584,493 | B1 * | 2/2017 | Leavy | H04L 63/104 |
| 10,764,221 | B1 * | 9/2020 | Dalonzo | H04L 51/52 |
| 11,115,363 | B1 | 9/2021 | Pina Ros et al. | |
| 11,265,281 | B1 * | 3/2022 | Baron | H04L 51/216 |
| 11,388,117 | B2 * | 7/2022 | Kim | H04L 51/046 |
| 11,388,128 | B1 * | 7/2022 | Voss | H04L 51/04 |
| 11,722,452 | B2 * | 8/2023 | Voss | H04L 51/04 709/204 |
| 2006/0168046 | A1 * | 7/2006 | Qureshi | H04L 51/212 709/206 |
| 2006/0177010 | A1 * | 8/2006 | Skakkebaek | H04M 3/5307 379/67.1 |
| 2007/0022213 | A1 | 1/2007 | Fahmy et al. | |

(Continued)

FOREIGN PATENT DOCUMENTS

EP      2490384 A1    8/2012

OTHER PUBLICATIONS

EPO—European Search Report for related European Patent Application No. 23182692.6, dated Nov. 16, 2023, 7 pages.

*Primary Examiner* — Sargon N Nano
(74) *Attorney, Agent, or Firm* — McDermott Will & Emery LLP

(57) ABSTRACT

A method to keep selected messages in a networked conversation thread includes receiving, from a first participant in a networked conversation, a selection of a first message to keep from a sequence of messages in the networked conversation. The method includes verifying that the networked conversation is slated for deletion at a selected time after the selection of the first message, storing the first message in a folder accessible to multiple participants in the networked conversation, and notifying a second participant authoring the first message that the first message has been stored in the folder and is accessible to the participants in the networked conversation.

20 Claims, 17 Drawing Sheets

(56) References Cited

U.S. PATENT DOCUMENTS

| | | | |
|---|---|---|---|
| 2010/0094809 A1* | 4/2010 | Consul | H04L 51/42 |
| | | | 707/662 |
| 2010/0287249 A1* | 11/2010 | Yigang | G06Q 10/107 |
| | | | 709/206 |
| 2010/0299763 A1* | 11/2010 | Marcus | G06F 21/10 |
| | | | 726/30 |
| 2013/0055112 A1* | 2/2013 | Joseph | H04L 12/1827 |
| | | | 715/758 |
| 2013/0198296 A1* | 8/2013 | Roy | G06Q 10/107 |
| | | | 709/206 |
| 2013/0218896 A1* | 8/2013 | Palay | G06F 16/31 |
| | | | 707/E17.014 |
| 2013/0218921 A1* | 8/2013 | Palay | G06F 16/3334 |
| | | | 707/769 |
| 2013/0254408 A1* | 9/2013 | Sreenivasan | G06Q 10/10 |
| | | | 709/227 |
| 2014/0114973 A1* | 4/2014 | Wetherell | G06F 16/35 |
| | | | 707/737 |
| 2016/0043979 A1* | 2/2016 | Stern | H04L 67/125 |
| | | | 709/206 |
| 2018/0270325 A1 | 9/2018 | Bonazzoli et al. | |
| 2018/0284961 A1* | 10/2018 | Henderson | G06F 3/0488 |
| 2020/0296066 A1 | 9/2020 | Penilla et al. | |
| 2021/0058359 A1* | 2/2021 | Lee | H04L 51/04 |
| 2021/0170297 A1* | 6/2021 | Mascia | G06V 40/172 |

* cited by examiner

KEEP SELECT MESSAGES IN NETWORKED GROUP CONVERSATION THREADS

CROSS-REFERENCE TO RELATED APPLICATIONS

The present disclosure is related and claims priority under 35 USC § 119(e) to U.S. Provisional Appln. No. 63/359,171, to Isabel Tewes, et-al. entitled KEEPING SELECT MESSAGES WHEN USING A DISAPPEARING MESSAGES THREAD, filed on Jul. 7, 2022, the contents of which are herein incorporated by reference, in their entirety, for all purposes.

BACKGROUND

Field

The present disclosure is generally related to protecting data and privacy in networked group conversation threads or chats. More specifically, the present disclosure includes strategies to save selected portions of the thread and maintain the prerogative of a message sender to remove their sent messages.

Related Art

Current group chat applications include a delete option that enables the deletion of a chat thread, thus enabling a more efficient use of network storage resources and protecting participants' privacy. However, people are reluctant to adopt the DM option for fear of losing at least one message in the thread that includes relevant information. Accordingly, losing every message in a thread is not the best option for all threads intended for deletion.

SUMMARY

In a first embodiment, a computer-implemented method includes receiving, from a first participant in a networked conversation, a selection of a first message to keep from a sequence of messages in the networked conversation, verifying that the networked conversation is slated for deletion at a selected time after the selection of the first message, storing the first message in a folder accessible to multiple participants in the networked conversation, and notifying a second participant authoring the first message that the first message has been stored in the folder and is accessible to the participants in the networked conversation.

In a second embodiment, a system includes one or more processors, and a memory storing instructions which, when executed by the one or more processors, cause the system to perform operations. The operations include to receive, from a first participant in a networked conversation, a selection of a first message to keep from a sequence of messages in the networked conversation, to verify that the networked conversation is slated for deletion at a selected time after the selection of the first message, to store the first message in a folder accessible to multiple participants in the networked conversation, and to notify a second participant authoring the first message that the first message has been stored in the folder and is accessible to the participants in the networked conversation.

In a third embodiment, a computer-implemented method includes requesting, via a network chat application running in a client device, to keep at least one message in a first conversation thread, wherein the first conversation thread is scheduled for a later deletion, accessing the at least one message in a folder for kept messages, and requesting, with the client device, to un-keep a second message from a second conversation thread, wherein the second message was sent to the second conversation thread from the client device.

In yet other embodiments, a system includes a first means to store instructions and a second means to execute the instructions and cause the system to perform a method. The method includes receiving, from a first participant in a networked conversation, a selection of a first message to keep from a sequence of messages in the networked conversation, verifying that the networked conversation is slated for deletion at a selected time after the selection of the first message, storing the first message in a folder accessible to multiple participants in the networked conversation, and notifying a second participant authoring the first message that the first message has been stored in the folder and is accessible to the participants in the networked conversation.

These and other embodiments will be evident from the present disclosure.

BRIEF DESCRIPTION OF THE DRAWINGS

Figure 4A:
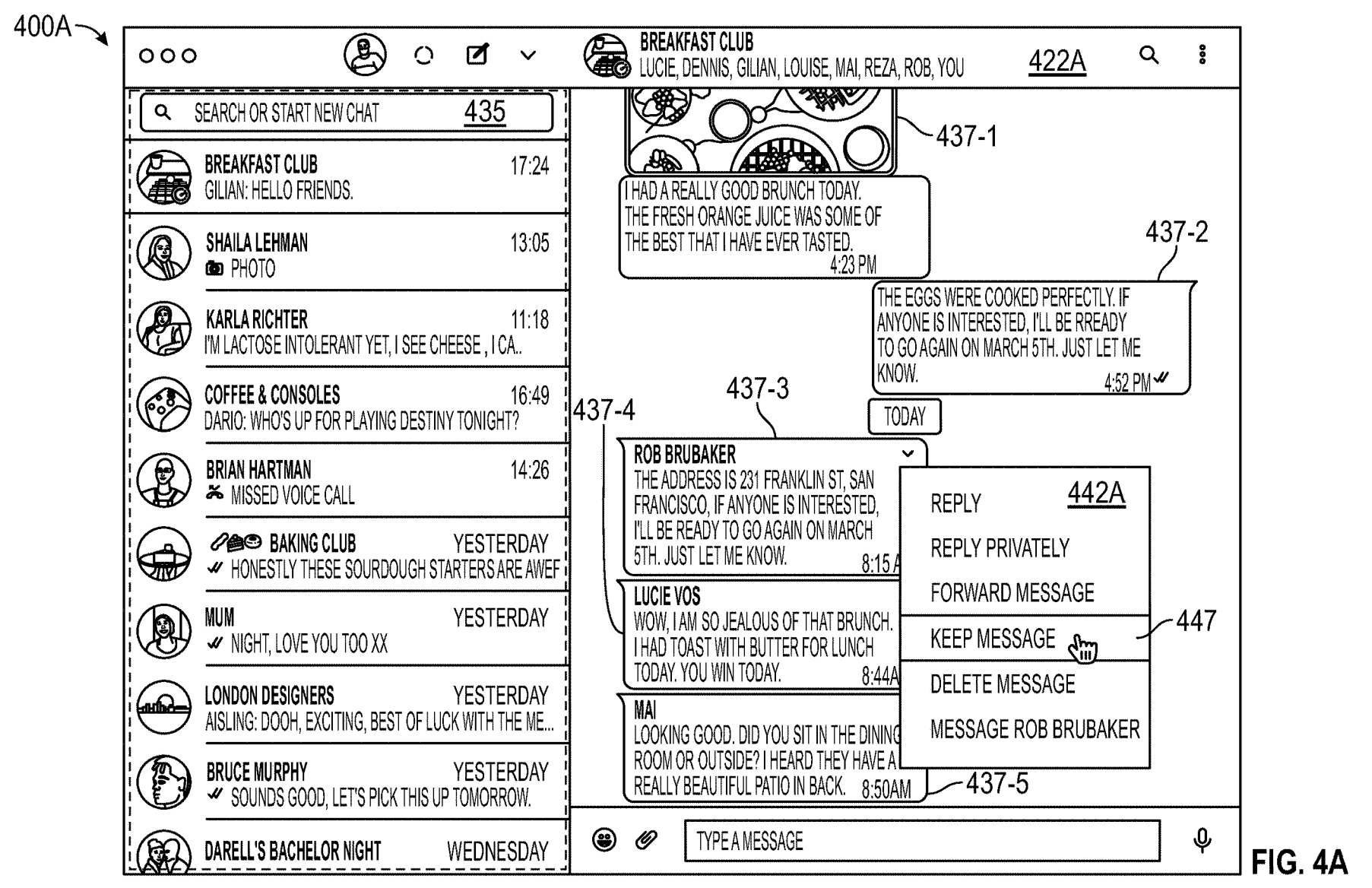
Figure 4B:
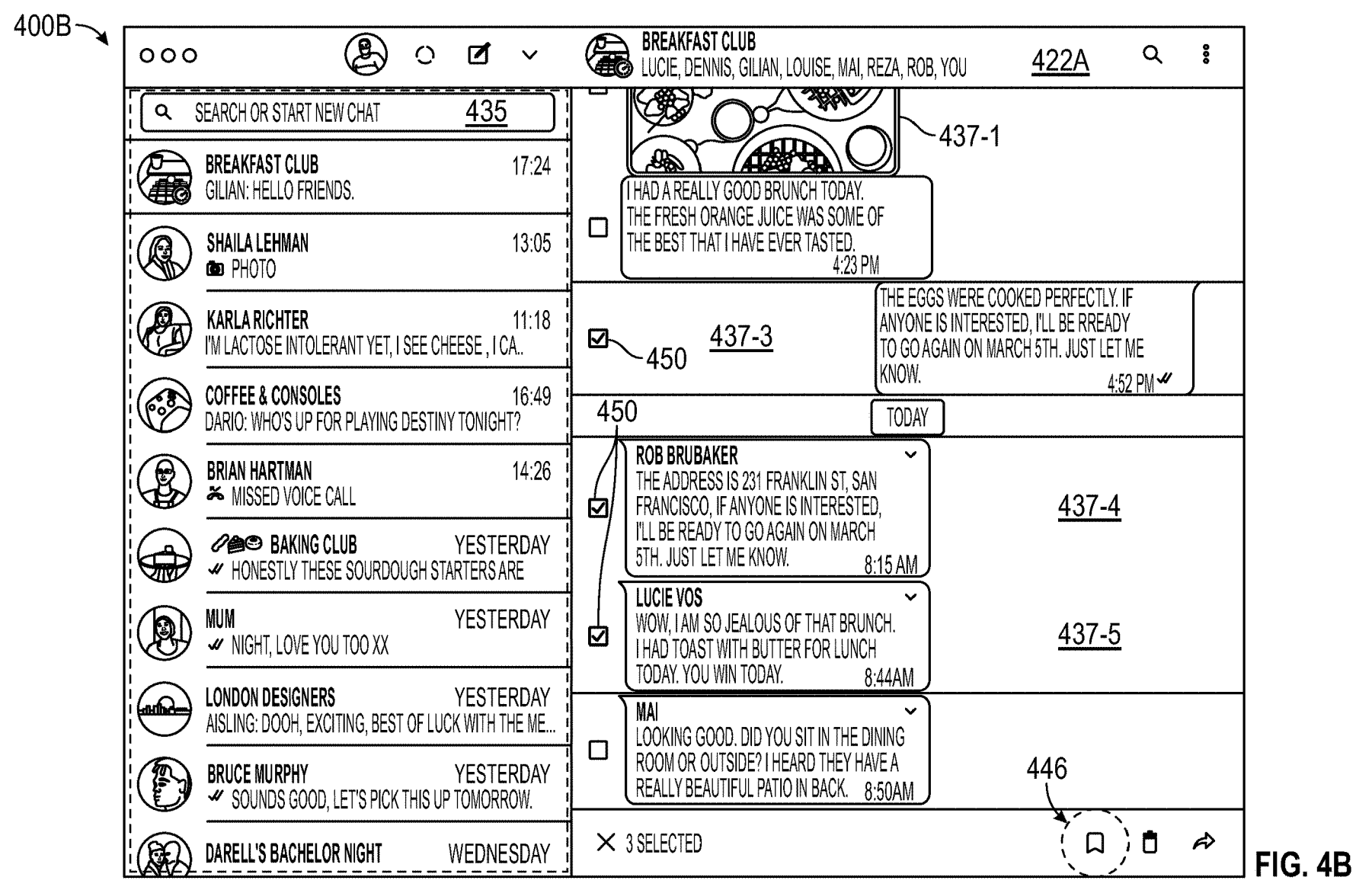
Figure 4C:
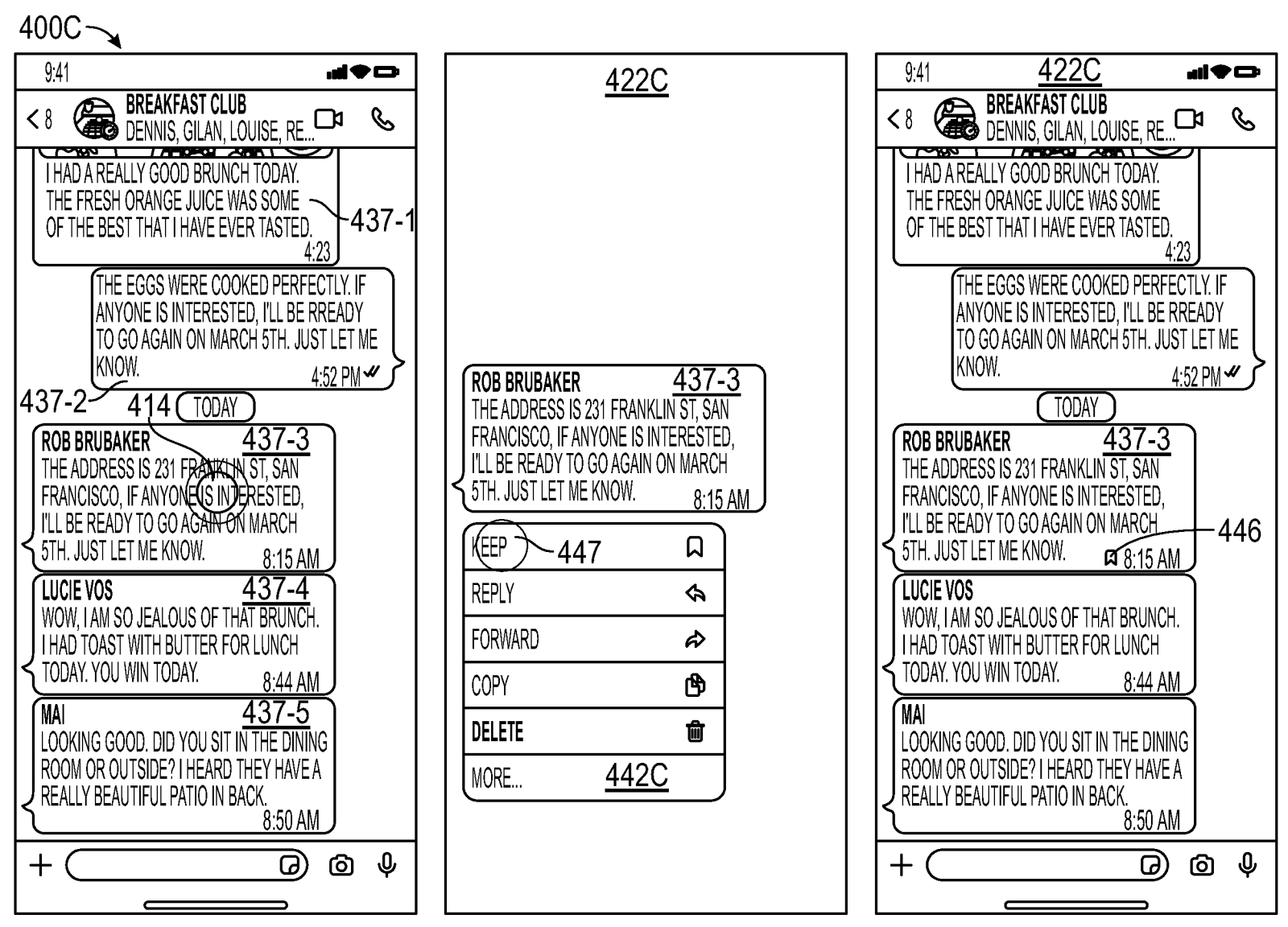

FIGS. 4A-4F illustrate screenshots from a client device displaying a network chat application including users selecting messages to keep in a group conversation thread that is otherwise set to disappear, according to some embodiments.

In the figures, elements having the same or similar reference numerals are associated with the same or similar attributes, unless explicitly stated otherwise.

DETAILED DESCRIPTION

Figure 1:
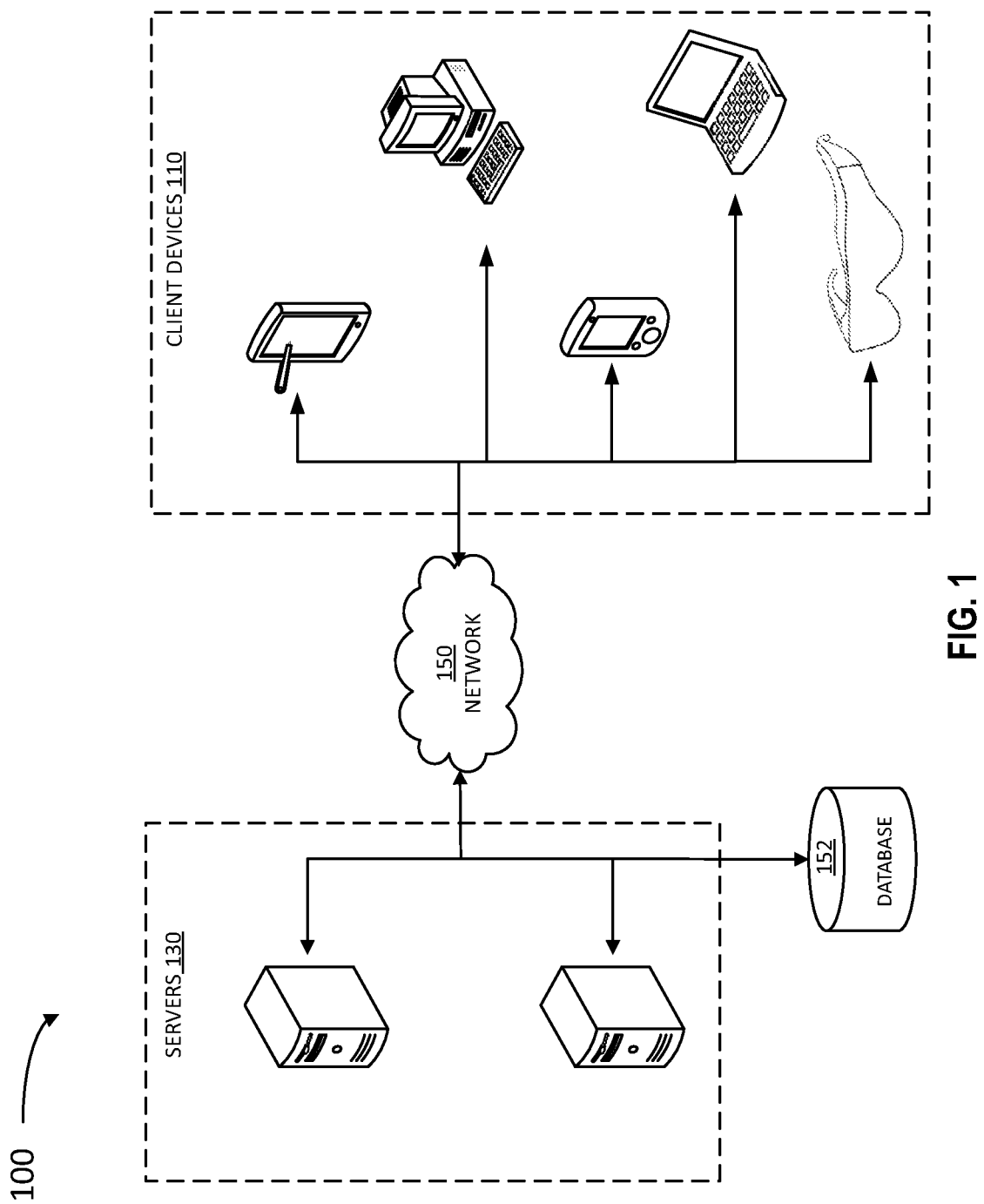
FIG. 1 illustrates a network architecture used to implement a feature to keep selected messages in a network chat, according to some embodiments.

Some chat applications include a disappearing messages tool (DM) that erases all the messages in a chat after a pre-selected period of time. The DM feature is a guarantee of privacy for the participants, and substantially reduces the use of memory in the network. However, when people want to keep a message that was sent in DM, they currently have two options: 1) forward the message to themselves (DM message forwarding is twice as much as forwarding of regular messages in one-on-one conversations and up to three-times regular message forwarding for groups), or 2) forward the message to a non-disappearing chat.

However, these ad-hoc workarounds create a fractured experience where certain messages are kept on some users' chat histories, without the sender being completely aware. Accordingly, it is desirable to give users an option to select the messages that are important and keep those from disappearing.

In some chat applications, a Disappearing Messages (DM) feature substantially reduces the amount of information stored in a database and provides a default privacy protection for users who may feel uncomfortable about saving too much chat content in the cloud. Because the feature is optionally selected by the users, it is desirable to add more attributes and options so more people in more conversations are attracted to the DM option.

Current ephemeral implementations are binary: When a delete chat option is selected, all messages in the chat disappear; and when the delete chat option is off, all messages are preserved for a likely extended period of time. Embodiments as disclosed herein avoid this dichotomy by providing participants the ability to select which messages they want to keep in a DM chat.

Not everything that is said in a chat needs to be saved for more than a few days or weeks, at most. A DM option helps protect user privacy by disappearing over time when the contents of the chat are no longer needed or relevant. However, even in the most banal of conversations, there may be one or more messages that do matter and that a participant may want to preserve, longer-term. For example, someone may have provided a unique recipe, or a contact information or address, that one of the participants may want to have available as a resource for later access. Adding the ability to selectively preserve one or more messages in a chat that is otherwise destined for deletion (e.g., via DM) is a highly desirable feature of DM and may be the tipping point for many users undecided about adopting the DM model.

A DM chat as disclosed herein resolves the above technical problems and makes a chat experience similar to real life, where what participants say stays in the moment, or shortly thereafter, affording more privacy to participants, with the additional benefit of keeping what matters for later access. Accordingly, chat participants can keep important messages and media from disappearing altogether in a DM application.

In embodiments as disclosed herein, participants will be able to 'keep' important messages in a DM thread. Moreover, participants can 'keep' select messages (from any other participant), photos, multimedia files, or PPT/audio notes and they stay visible to all participants in the chat. In some embodiments, anyone in the chat can 'keep' or 'un-keep' a message, be it the message sender, or anyone else participating in the chat, as long as the chat hasn't lapsed (e.g., the time duration selected in the DM option for deleting the entire chat). In some embodiments, a group administrator may put limits to whom and how often a message may be kept and limit the option only to a group administrator. In some embodiments, the selected messages are kept in chronological order in a specific folder associated with the chat, which is accessible to all participants, beyond the lapsing of the entire chat. Accordingly, ephemerality options become easier to use long-term, ensuring users that the DM feature will not lose key information while making more efficient use of storage resources. To respect privacy, when a chat participant which is not the sender has kept a message, in some embodiments, the message sender is notified that the message has been kept, and by whom.

In some embodiments, an un-keep option is provided, to undo a keep action on any given message, up to a period of time. Accordingly, any one of the chat participants may de-select a kept message and slate it for deletion. Permissions to un-keep messages may be handled similarly to permissions for keeping messages. However, in some embodiments, a message sender has the prerogative (sender "superpowers") to un-keep a message over any other participant in the chat. This addresses any privacy concerns for chat participants that their own words or media files may be stored against their will. In some embodiments, a chat participant may keep a message in the chat generated by a former participant after leaving the chat group. The former participant may un-keep the message after re-joining the chat group. In some embodiments, a former chat participant is not allowed to keep a message in the chat. In some embodiments, an archived network chat may allow a KiC feature for its participants.

Keep in chat (KiC) features as disclosed herein make participants feel more comfortable adopting ephemeral messaging strategies such as DM as a default feature. It is expected that modifying a DM feature as disclosed herein will increase the rate of adoption of DM chats. Likewise, it is expected to see a decrease in the number of forwarded messages while in DM. It is also expected that KiC features will improve retention of DM adopters by reducing the stakes for turning DM 'on.'

Example Architecture

FIG. 1 illustrates a network architecture 100 used to implement a feature to keep selected messages in a network chat, according to some embodiments. Architecture 100 may include servers 130 and a database 152, communicatively coupled with multiple client devices 110 via a network 150. Any one of servers 130 may host a chat application running on client devices 110, used by one or more of the participants in the networked chat. In some embodiments, database 152 may store, at least temporarily, some of the messages and data associated to one or more chats hosted by the chat application (e.g., pictures, videos, and other media files). Client devices 110 may include any one of a laptop computer, a desktop computer, or a mobile device such as a smart phone, a palm device, or a tablet device. In some embodiments, client devices 110 may include a headset or other wearable device (e.g., a virtual reality or augmented reality headset or smart glass), such that at least one participant may be running an immersive reality chat application installed therein.

Network 150 can include, for example, any one or more of a local area network (LAN), a wide area network (WAN), the Internet, and the like. Further, network 150 can include, but is not limited to, any one or more of the following network topologies, including a bus network, a star network, a ring network, a mesh network, a star-bus network, tree or hierarchical network, and the like.

Figure 2:
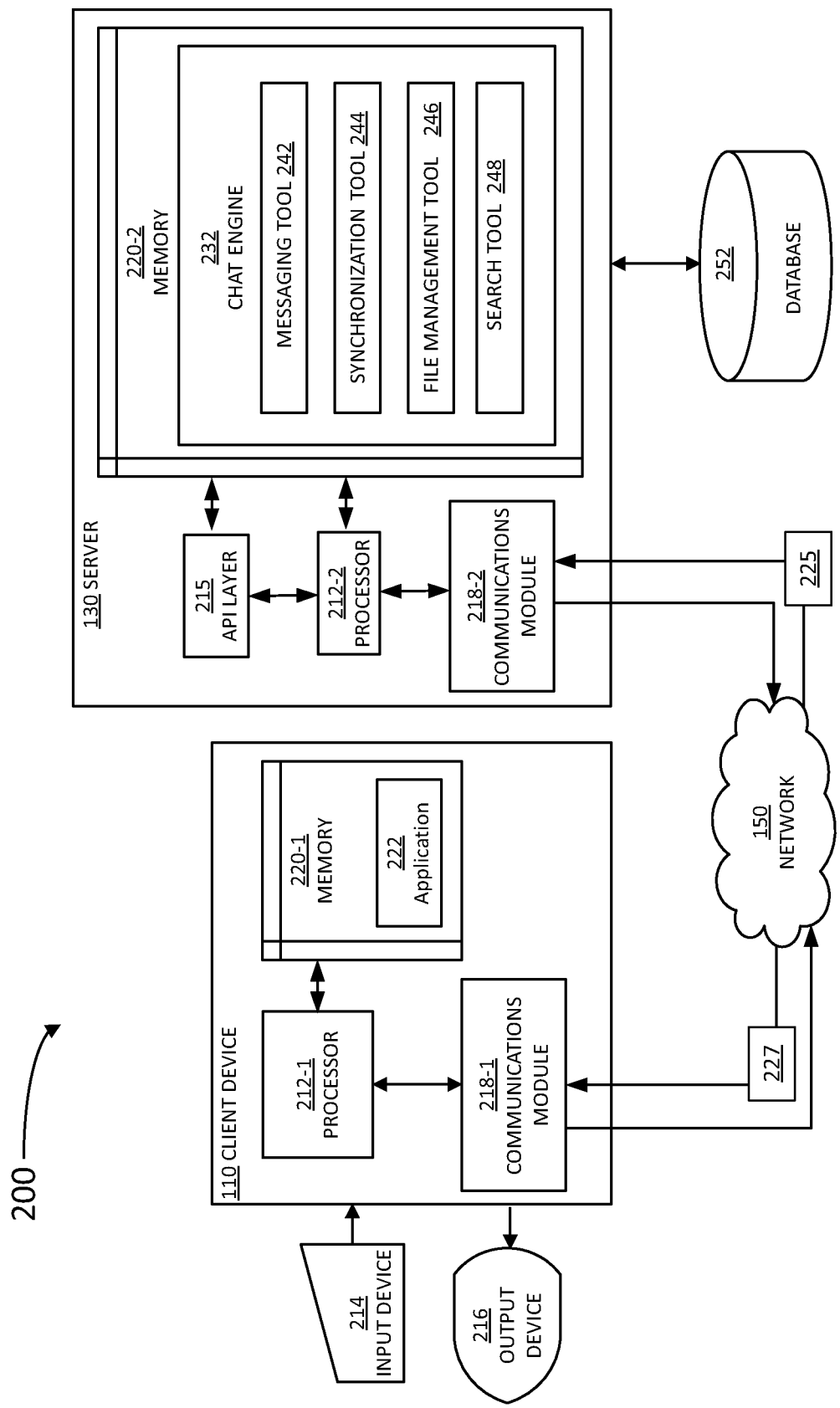
FIG. 2 is a block diagram illustrating details of devices used in the architecture of FIG. 1, according to some embodiments.

FIG. 2 is a block diagram 200 illustrating details of a client device 110 and a server 130 used in a network architecture as disclosed herein (e.g., architecture 100), according to some embodiments. Client device 110 and server 130 are communicatively coupled over network 150 via respective communications modules 218-1 and 218-2

(hereinafter, collectively referred to as "communications modules 218"). Communications modules 218 are configured to interface with network 150 to send and receive information, such as requests, responses, messages, and commands to other devices on the network in the form of datasets 225 and 227. Communications modules 218 can be, for example, modems or Ethernet cards. Client device 110 may be coupled with an input device 214 and with an output device 216. Input device 214 may include a keyboard, a mouse, a pointer, or even a touch-screen display that a consumer may use to interact with client device 110. Likewise, output device 216 may include a display and a speaker with which the consumer may retrieve results from client device 110. Client device 110 may also include a processor 212-1, configured to execute instructions stored in a memory 220-1, and to cause client device 110 to perform at least some of the steps in methods consistent with the present disclosure. Memory 220-1 may further include a chat application 222. Chat application 222 includes specific instructions which, when executed by processor 212-1, cause a dataset 227 from server 130 to be displayed for the consumer. In some embodiments, chat application 222 runs on any operating system (OS) installed in client device 110. In some embodiments, chat messages may be kept even when the KiC feature is not originated in the OS of client device 110. In some embodiments, chat application 222 may run out of a web browser, installed in the client device.

Dataset 227 may include multiple messages and multimedia files provided by one or more participants in a chat. A participant using client device 110 may store at least some of the messages and data content in dataset 227 in memory 220-1. In some embodiments, a participant may upload, with client device 110, a dataset 225 onto server 130, as part of the chat. Accordingly, dataset 225 may include a message from the participant, or a multimedia file that the participant wants to share in the chat.

A database 252 may store data and files associated with a chat from chat application 222 (e.g., one or more of datasets 227 and 225).

Server 130 includes an application programming interface (API) layer 215, which controls application 222 in each of client devices 110. API layer 215 may also provide tutorials to chat participants in client devices 110 as to new features in chat application 222 (e.g., a DM feature, or a KiC feature). Server 130 also includes a memory 220-2 storing instructions which, when executed by a processor 212-2, causes server 130 to perform at least partially one or more operations in methods consistent with the present disclosure.

Memory 220-2 includes a chat engine 232. Chat engine 232 includes a messaging tool 242, a synchronization tool 244, a file management tool 246, and a search tool 248. Messaging tool 242 may be configured to collect messages from datasets 225 sent by multiple client devices 110 during a chat and provide a feed with a dataset 227 to all client devices 110 for participants in the chat. Datasets 225 and 227 may include text messages (including the name of the participant sending the message, and the time), pictures, one-time-view pictures, videos, and other content (e.g., reactions to messages, such as emojis, likes, and other) provided by each participant in the chat, ordered chronologically. Synchronization tool 244 is configured to provide the chronological ordering of datasets 225 as they are received in server 130 from the different client devices 110. Synchronization tool 244 keeps track of timelines set by a DM feature, such as a chat expiration date, and communicates with messaging tool 242 to provide alerts and other messages to chat participants related to relevant deadlines.

For example, when a participant extemporaneously requests to "un-keep" a message in a DM chat that is past due for deletion (e.g., all un-kept messages in the chat have been removed), synchronization tool 244 alerts messaging tool 242, which then provides a message to the participant requesting the "un-keep" action that the message with be automatically removed from database 252.

File management tool 246 may organize folders in database 252 such that chat participants with client device 110 may easily navigate through chat records. For example, file management tool 246 may generate a "Kept Messages" folder associated with a given chat. The Kept Messages folder may include all the messages associated with a given chat that have been kept by the participants. In some embodiments, file management tool 246 provides access to the Kept Messages folder to any and all of the participants in the chat. In some embodiments, file management tool 246 may also create personalized folders for each participant or member of the chat network hosted by server 130, storing messages (or links thereof) that were sent by the participant in one or more chats, and that have been kept (by the participant itself or by anyone else). A search tool 248 enables search queries by any participants on the chat records maintained in database 252 (e.g., a Kept Messages folder).

In some embodiments, the chat content that can be kept by file management tool 246 includes text messages, photos and video, push-to-talk (PTT) messages, and the like. In some embodiments, file management tool 246 may not keep messages that have been previously deleted or that expired due to DM duration, reactions to other messages (e.g., emojis, likes, and other), or view-once photos that have been appropriately labeled as such.

Processors 212-1 and 212-2, and memories 220-1 and 220-2 will be collectively referred to, hereinafter, as "processors 212" and "memories 220," respectively.

Figure 3:
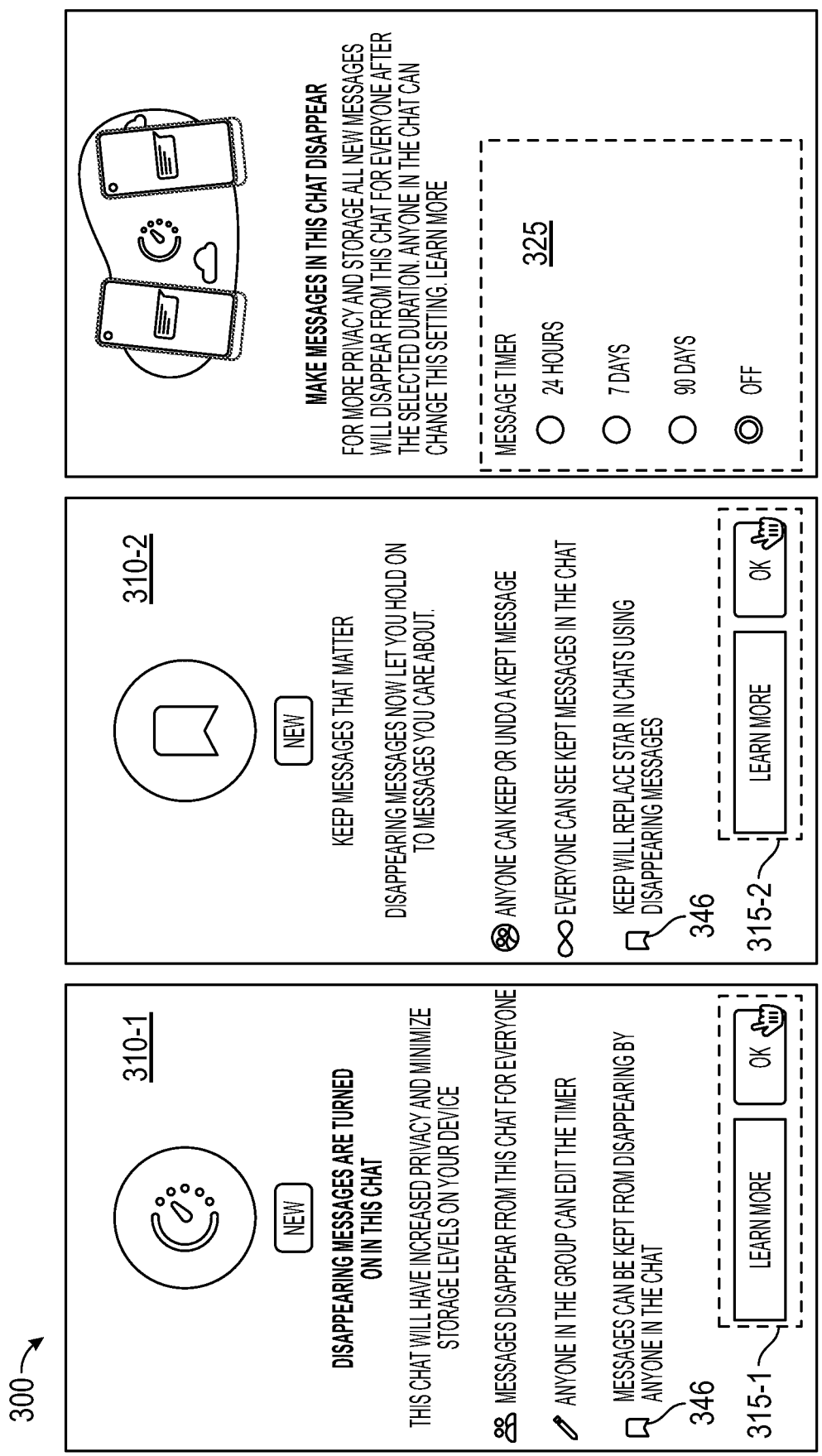
FIG. 3 illustrates screenshots of a disappearing messages feature tutorial for participants in a network chat application, according to some embodiments.
Figure 4D:
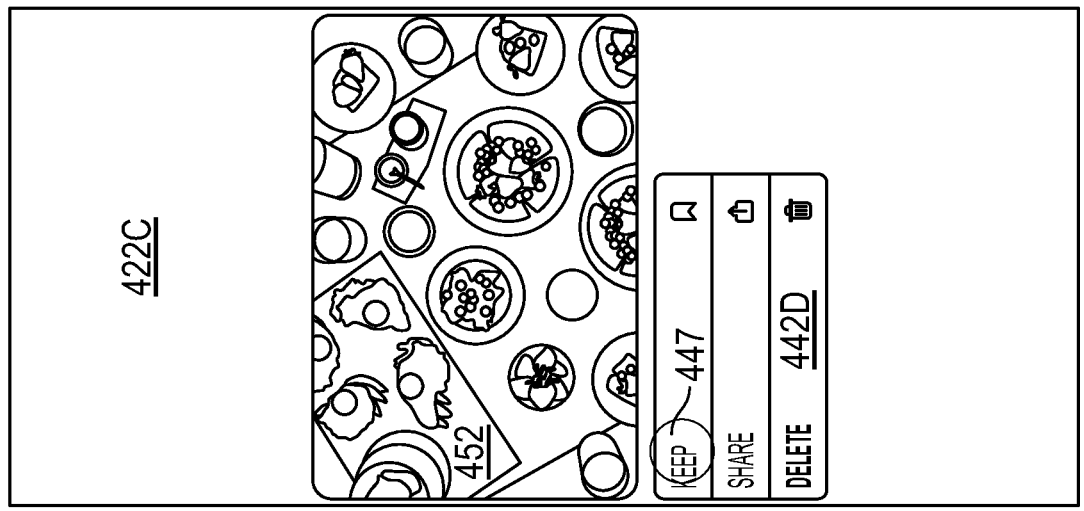
Figure 4D:
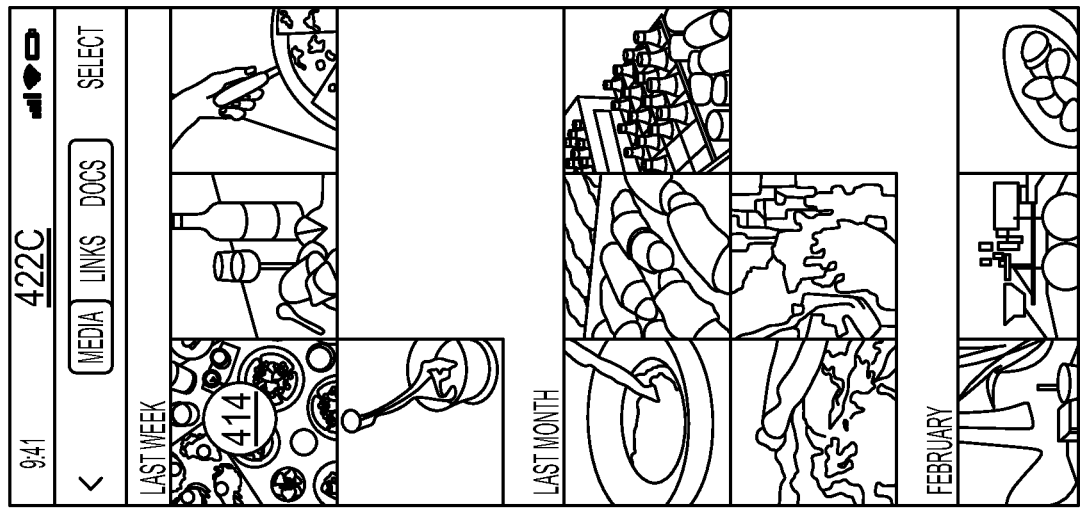
Figure 4D:
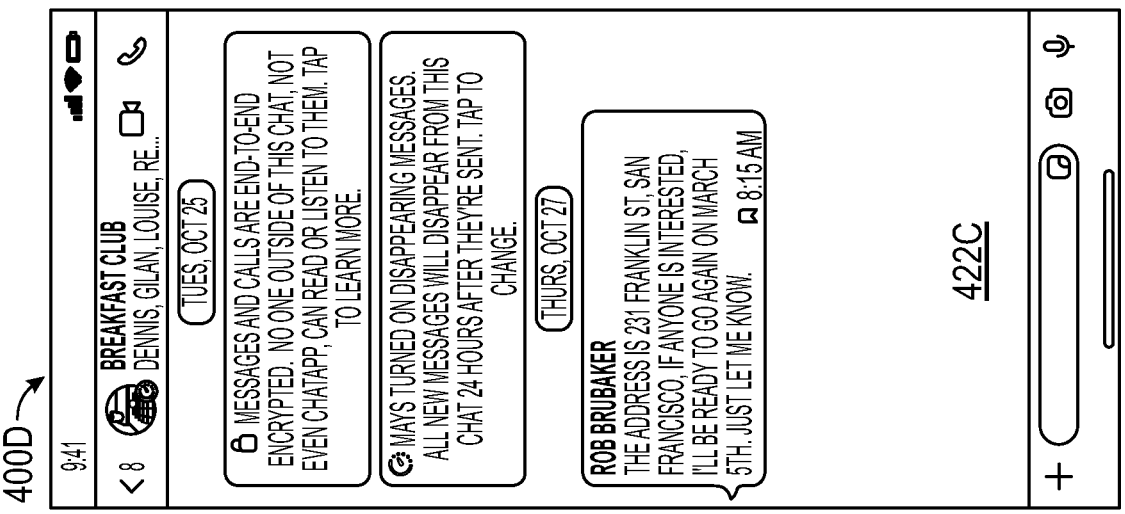
Figure 4E:
Figure 4E:
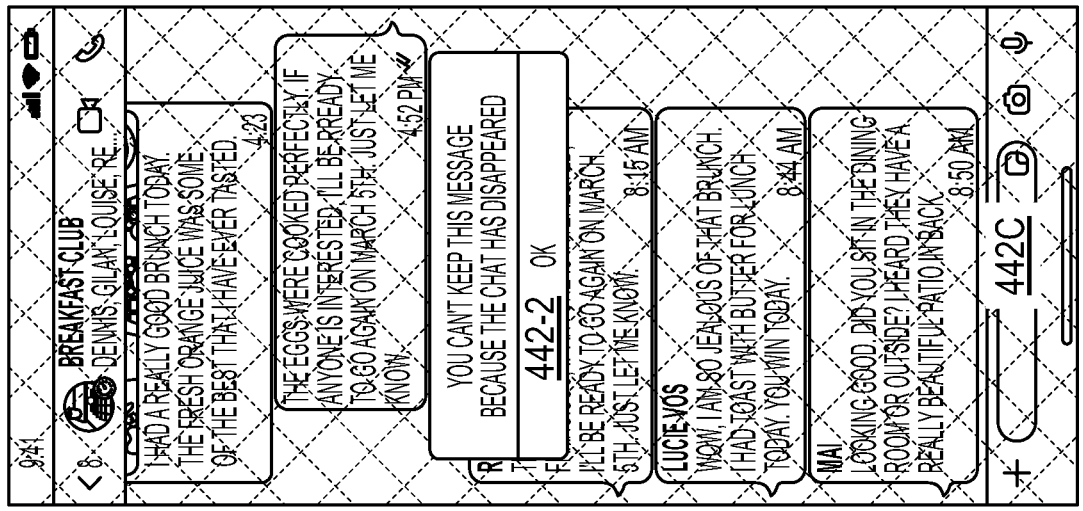
Figure 4E:
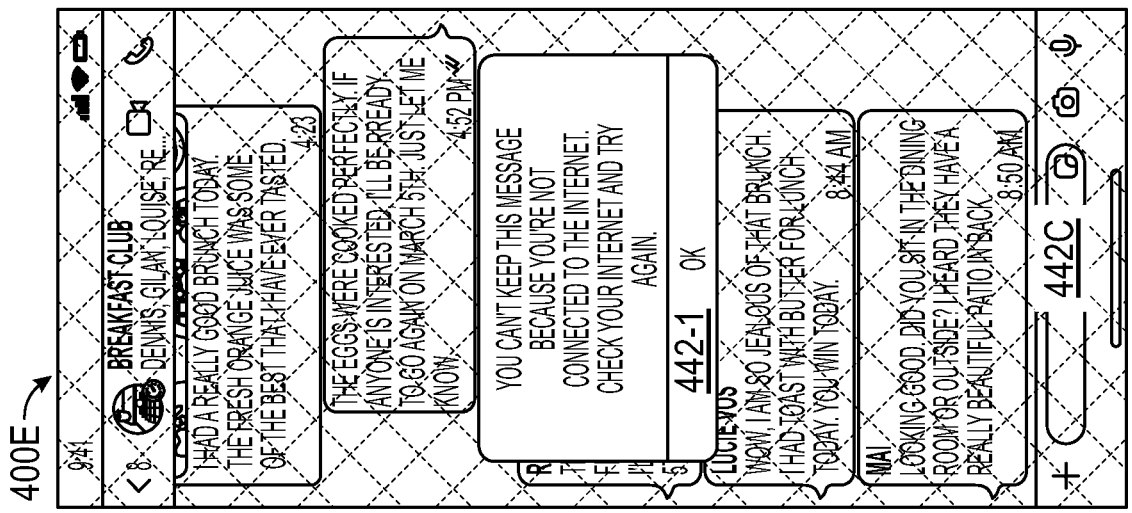
Figure 4F:
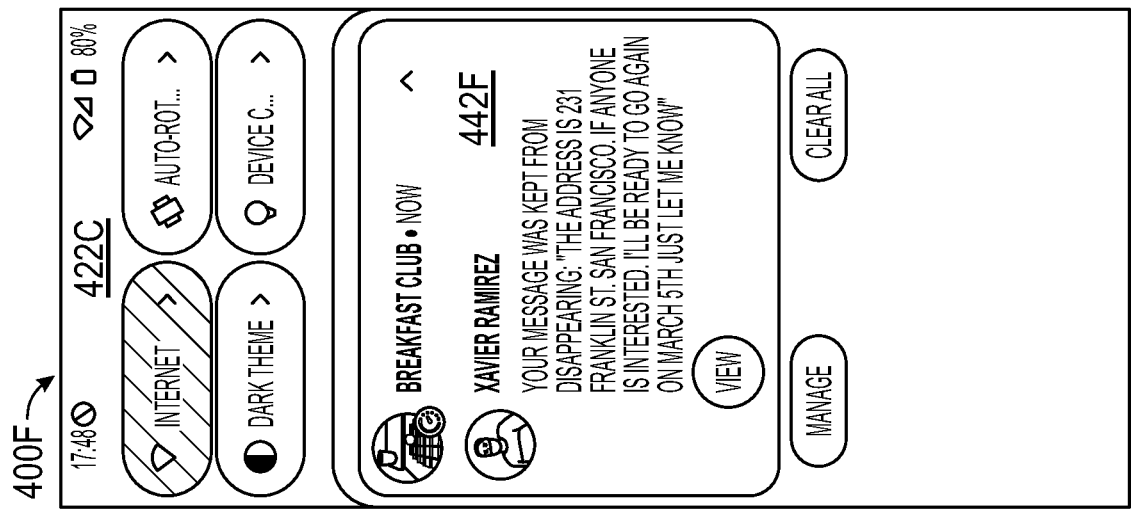

FIG. 3 illustrates screenshots 300 of a DM feature tutorial 310-1 and a KiC tutorial 310-2 (hereinafter, collectively referred to as "tutorials 310") for participants in a network chat application (e.g., application 222), according to some embodiments. Tutorials 310 may be provided for participants that are first users of either the DM and/or the KiC features.

DM tutorial 310-1 may include a bullet slide describing basic attributes of the DM feature. Some of these attributes may include: messages disappear from this chat for everyone, anyone in the group can edit the other, and messages can be kept from disappearing by anyone in the chat (the latter identified with a symbol 346). DM tutorial 310-1 may also display a message timer 325, which offers a user (or administrator), an option for the length of time to lapse before deleting all records of the chat (24 hours, 7 days, 90 days, or any custom time period). In some embodiments, DM tutorial 310-1 includes a notification that messages disappear unless 'Kept' under the KiC feature. In some embodiments, DM tutorial 310-1 includes two versions and appears only once. A first version is an Initiator DM tutorial 310-1, which appears after the user has adopted DM and starts with "Get Started with . . . ." This includes DDM if it is the first time using the DM feature. A second version is a Recipient DM tutorial 310-1, which appears to any chat participant when someone else has turned on DM. Recipient DM tutorial has a more introductory tone.

KiC tutorial 310-2 may list attributes such as any participant can keep or un-keep a kept message (in a DM chat), everyone can see kept messages in the chat, and the like. By clicking OK on any one of tabs 315-1 or 315-2 (hereinafter, collectively referred to as "tabs 315"), a participant can dismiss the tutorials and start using the chat application.

In some embodiments, KiC tutorial 310-2 includes a message that appears chronologically in the chat and lets the participants know that a 'Keep' option is available and messages that matter may be kept in memory. In some embodiments, this message appears in all DM chats as the KiC feature is rolled out, regardless of user actions. In some embodiments, KiC tutorial 310-2 is a half sheet that appears once per user (e.g., at launch for any user who has at least one DM chat when they open that chat). In some embodiments, the system may send messages to participants and users, on a regular basis, advising of the sender superpowers to un-keep messages, to emphasize privacy protection in the KiC feature.

FIGS. 4A-4F illustrate screenshots 400A, 400B, 400C, 400D, 400E, and 400F (hereinafter, collectively referred to as "screenshots 400") from a client device displaying network chat applications 422A and 422C (hereinafter, collectively referred to as "chat applications 422") including users selecting messages to keep in a group conversation thread that is otherwise set to disappear (e.g., a DM chat), according to some embodiments. Chat application 422A may be installed in a desktop, laptop, or even a mobile device, running one preferred operating system (OS). Chat application 422C may be running in a mobile device, with another preferred OS. Accordingly, the features and attributes of screenshots 400 are the same or similar in both chat applications 422, regardless of the OS running each. The chat may include multiple participants 435, listed on the screen, together with messages 437-1, 437-2, 437-3, 437-4, and 437-5 (hereinafter, collectively referred to as "messages 437"). The 'Keep' option disables DM lapsing on the selected ones of messages 437 so the message does not disappear.

Screenshot 400A includes a menu 442A including a 'Keep Message' option 447. Menu 442A may be displayed when the user right-clicks on a selected message (e.g., message 437-3).

Screenshot 400B illustrates a multi-select option for keeping messages. Accordingly, checkmarks 450 indicate that messages 437-3, 437-4, and 437-5 have been selected to be kept (cf. icon 446). By default, any one of participants 435 can 'Keep' any one of messages 437. In some embodiments, a participant may select multiple messages 437 to be kept at once. If one of the multiple messages selected is un-keepable (e.g., according to an administrator preference or rule), an alert indicating the un-keepable message will be issued, while the other, keepable messages, are kept. In some embodiments, an administrator can restrict a 'keep' option to administrators-only. In addition, some embodiments may include an administrator-only option which, when turned on, the system only allows the administrator to keep or un-keep messages, or change the DM lapse time.

Screenshot 400C illustrates a mobile application wherein to keep a message, the user may press (e.g., long press) a 'Keep' tab 447 in a menu option 442C. Menu option 442C is prompted by pressing (input 414) a selected message 437-3 in the chat. By default, anyone in a DM chat can 'Keep' any message, as long as the DM specified duration has not expired. In groups, administrators can restrict the DM setting to "Administrators Only" which means that only administrators can change DM duration or 'Keep' a message. If for any reason message 437-3 was 'un-keepable' (e.g., based on an administrator decision or a privacy rule or setting), keep tab 447 would not appear in menu 442C, or it would be disabled.

Screenshot 400D illustrates a keep action on a picture 452 sent in a chat 422C when a participant presses on the picture (input 414). Input 414 prompts a menu 442D and by pressing keep tab 447, picture 452 is selected for keeping.

Screenshot 400E illustrates messages 442-1, 442-2, and 442-3 (hereinafter, collectively referred to as "messages 442"). Messages 442 may indicate that a selected message may not be kept, e.g., because the participant is not connected to the internet (442-1), or because the DM chat has already disappeared (442-2). Message 442-3 indicates that a message that the participant desires to un-keep will disappear automatically because the DM chat has already been deleted. When there are multiple error messages or warnings like the above, these may be shown as an error list for the participant.

Screenshot 400F illustrates a message 442F informing the sender that one of its messages has been kept. Message 442F includes a text description of the message that has been kept. Message 442F protects the privacy of the participant who sent the kept-message. Accordingly, if the sender is not happy with keeping the message, it will have the prerogative to un-keep the message at any point. In some embodiments, message 442F is a push notification from the host server to the sender of the kept message. Accordingly, for other chat participants, the host server may not create a push notification, and the kept message will simply stay in the chat, showing 'Keep' icon 446, and appear in the 'Kept' folder. When the sender has put application 422C in the background, message 442F pops out for view. If the sender is logged into application 422C, message 442F appears in an in-app notification.

Figure 5:
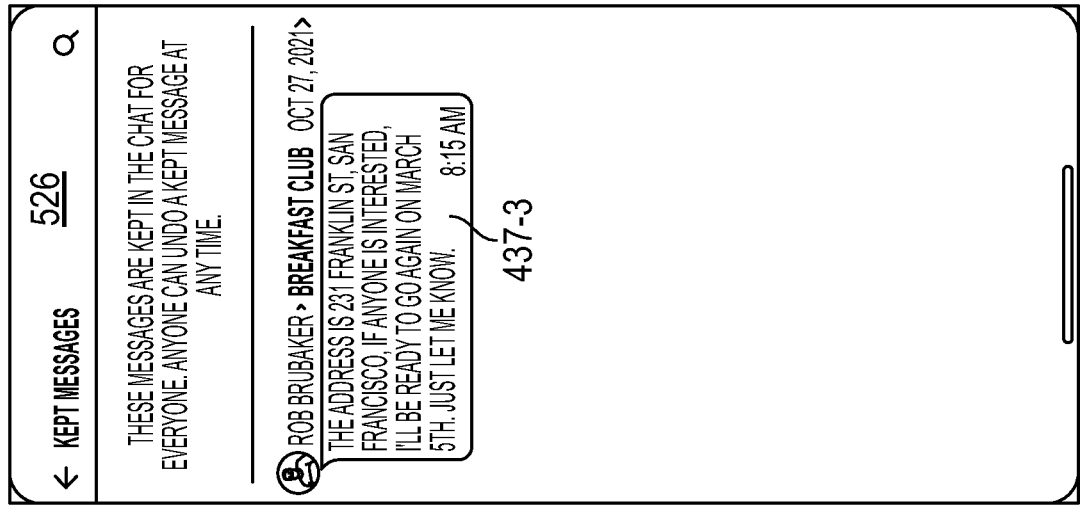
FIG. 5 illustrates screenshots from a client device displaying a folder with kept messages in a network chat application, according to some embodiments.
Figure 5:
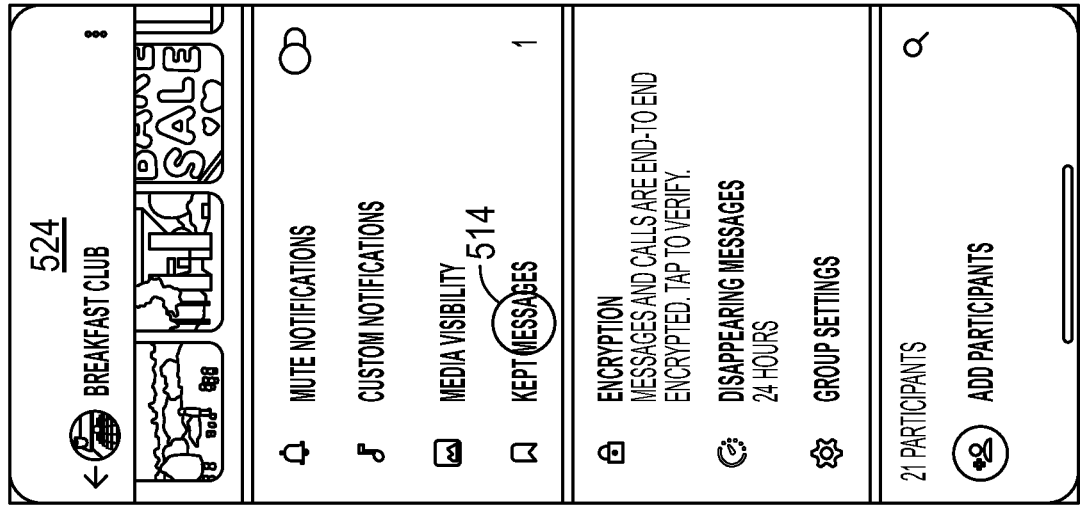
Figure 5:
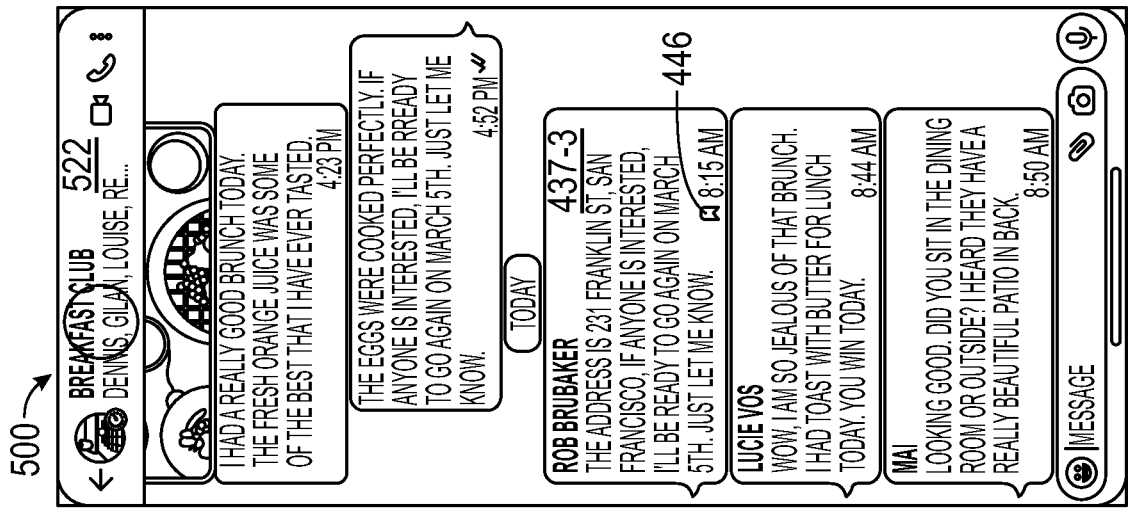

FIG. 5 illustrates screenshots 500 from a client device displaying a folder 526 with kept messages in a network chat application 522, according to some embodiments. Chat 522 illustrates several messages, including message 437-3, indicated as 'kept' (cf. icon 446). Additionally, any participant in chat 522 may tap into group information 524 and select folder 526 that includes kept messages (input 514). A screen showing the content of folder 526 includes message 437-3.

Folder 526 may include additional information (e.g., message sender, time and date of sending). In some embodiments, folder 526 may also include the name of the participant who requested message 437-3 be kept. In some embodiments, folder 526 may include a sub-folder including media files having a particularly large size (e.g., "larger than 5 MB," and the like).

Figure 6:
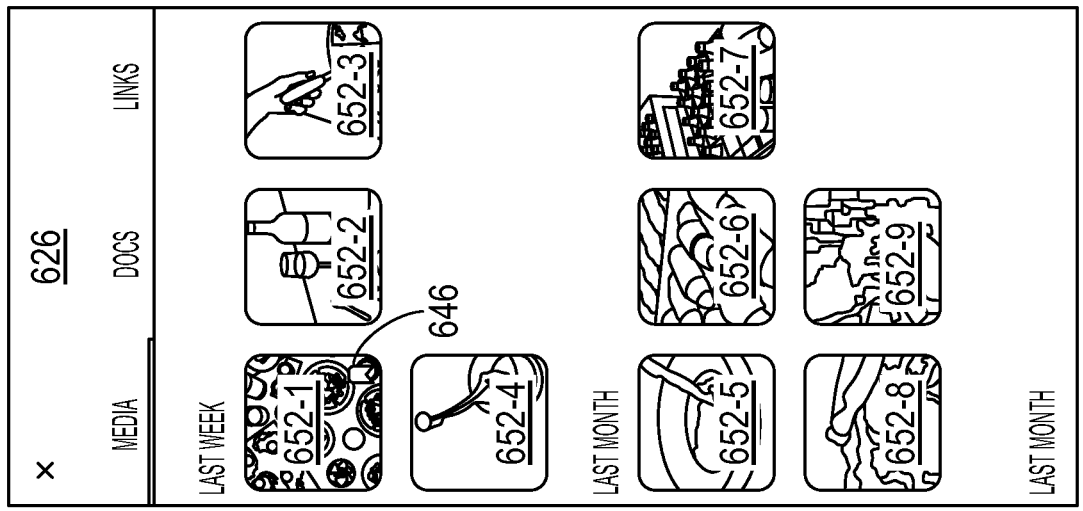
FIG. 6 illustrates screenshots from a client device displaying a selection of a multimedia file to keep in a network chat application, according to some embodiments.
Figure 6:
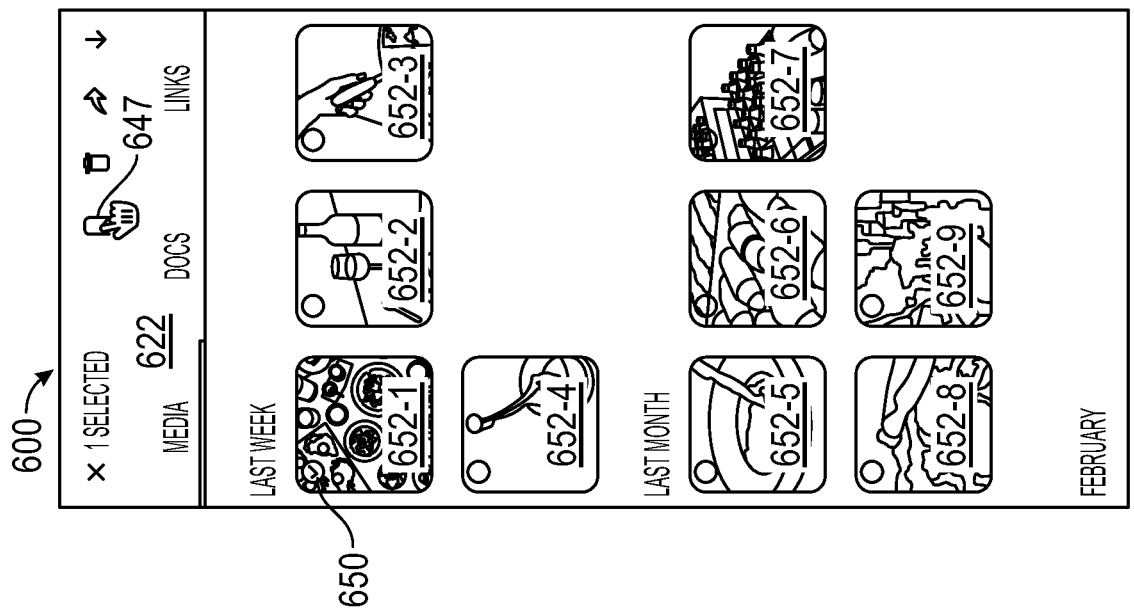

FIG. 6 illustrates screenshots 600 from a client device displaying a selection of media files 652-1, 652-2, 652-3, 652-4, 652-5, 652-6, 652-7, 652-8, and 652-9 (hereinafter, collectively referred to as "media files 652") to keep in a network chat application 622, according to some embodiments. In addition to media files, the KiC option may also preserve network addresses and links (e.g., hypertext markup language -html- and hypertext transfer protocol secure -https-addresses, and the like).

Media files 652 may include pictures, videos, video clips, music files, soundbites, and the like. The user may select any one of media files 652 with a checkmark 650, and then click on the keep icon 647 to have the selected media file saved in a media folder 626. Note that media file 652-1 appears with a 'kept' icon 646, and it will also show up in a 'Kept Messages' folder, as disclosed herein (cf., Kept Messages folder 526).

Figure 7A:
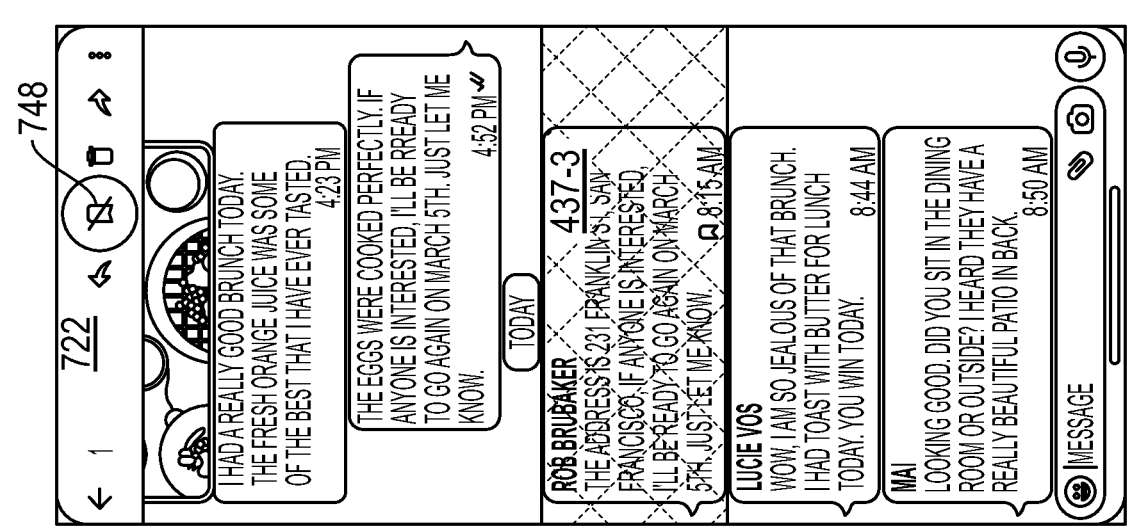
FIGS. 7A-7B illustrate screenshots from a client device displaying an un-keep selection in a network chat application, according to some embodiments.
Figure 7A:
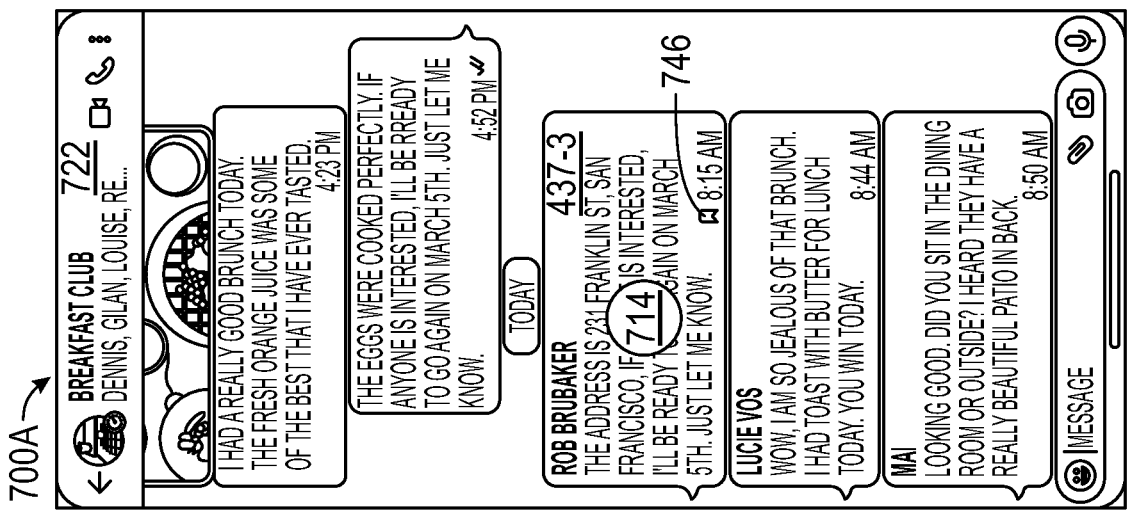
Figure 7B:
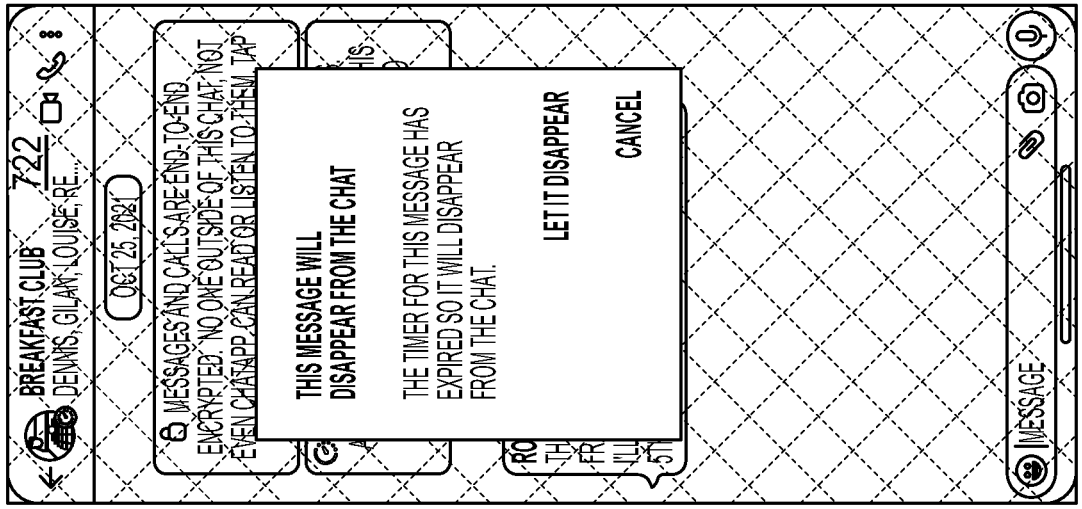
Figure 7B:
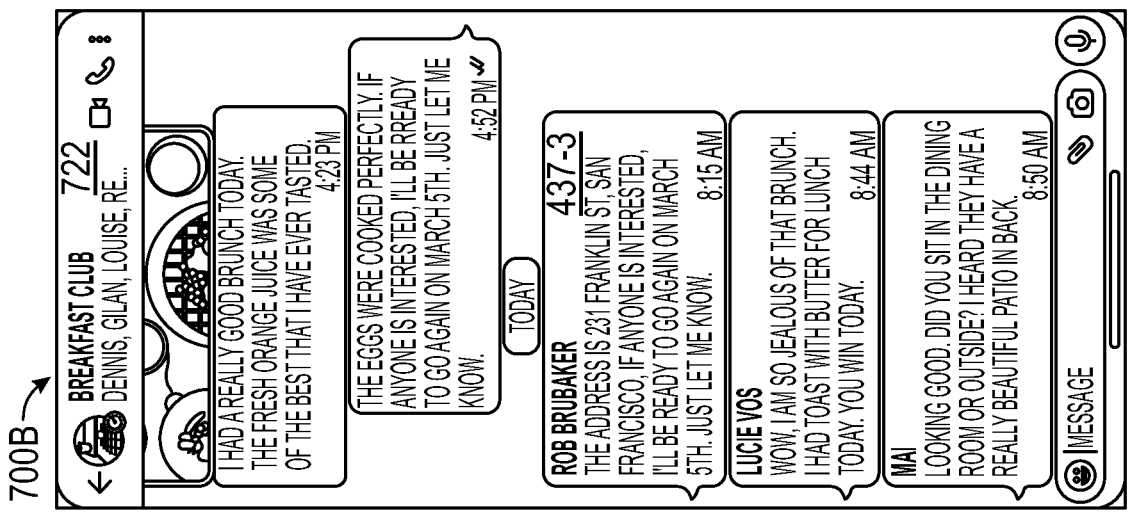

FIGS. 7A-7B illustrate screenshots 700A and 700B (hereinafter, collectively referred to as "screenshots 700") from a client device displaying an un-keep selection 748 in a network chat application 722, according to some embodiments.

There are several use cases for allowing users to undo KiC:

1) Fat fingers: A participant may be trying out the KiC feature or hit the 'Keep' button by mistake. In such scenarios, it is desirable to leave the option for a participant to un-keep one or more messages.

2) Temporary importance: A 'kept' message may be sharing time-sensitive information (e.g., which restaurant people are meeting at), but participants may want to 'un-Keep' or undo KiC messages once the information is no longer relevant.

3) Privacy preference: A sender may wish to keep privacy above other considerations and simply may not want a given message to be permanent.

In screenshots 700A, an 'Un-Keep' option 748 is available only for kept messages (e.g., message 437-3). By pressing (input 714) kept message 437-3 in chat 722, the participant may open a second window illustrating an un-keep option 748 (message 437-3 is indicated as "selected" by keep indicator 746). Then, by clicking un-keep option 748, message 437-3 is un-kept (e.g., slated for deletion once DM chat 722 is deleted).

Once the undo or 'un-keep' action is selected, application 722 may generate screenshots 700B. Accordingly, when the original duration of un-kept message 437-3 has passed (e.g., DM chat 722 is lapsed), message 437-3 will be automatically deleted, and application 722 issues a warning 725 including a choice to "Let it disappear," or to "cancel" the un-keep action. When DM chat 722 has not lapsed, un-kept message 437-3 will last until DM chat 722 expires, as scheduled. When a sender 'un-keeps' their own message, that message will disappear and no one else can 'keep' it. In some scenarios, two participants may be logged into SM chat 722 when the first participant decides to 'un-keep' a message. If this occurs after a DM lapsing, the message will disappear from the chat as soon as the first participant logs off. Other resolutions may be applied, wherein the second participant is informed that the message will disappear, before this happens.

In addition to better protect privacy, un-keep option 748 helps reduce the information overload/redundancy which may be overwhelming to some users, especially when someone has activated a KiC option by accident or mistake.

Figure 8:
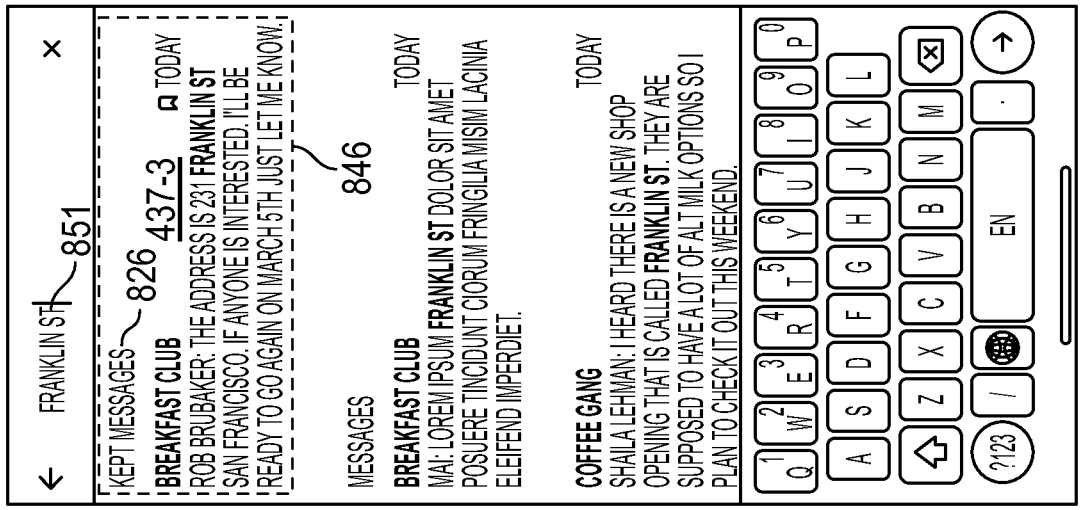
FIG. 8 illustrates screenshots from a client device displaying a search in a kept messages folder in a network chat application, according to some embodiments.
Figure 8:
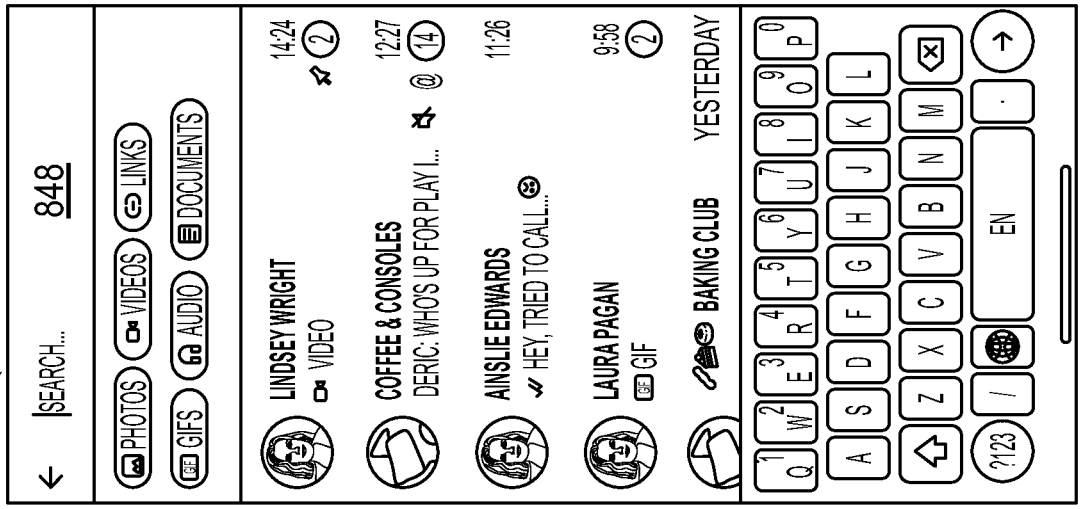

FIG. 8 illustrates screenshots 800 with a search tool 848. A search query 851 is acted on on a kept messages folder 826, and kept message 437-3 is promptly retrieved when the text of the message includes a match.

Figure 9:
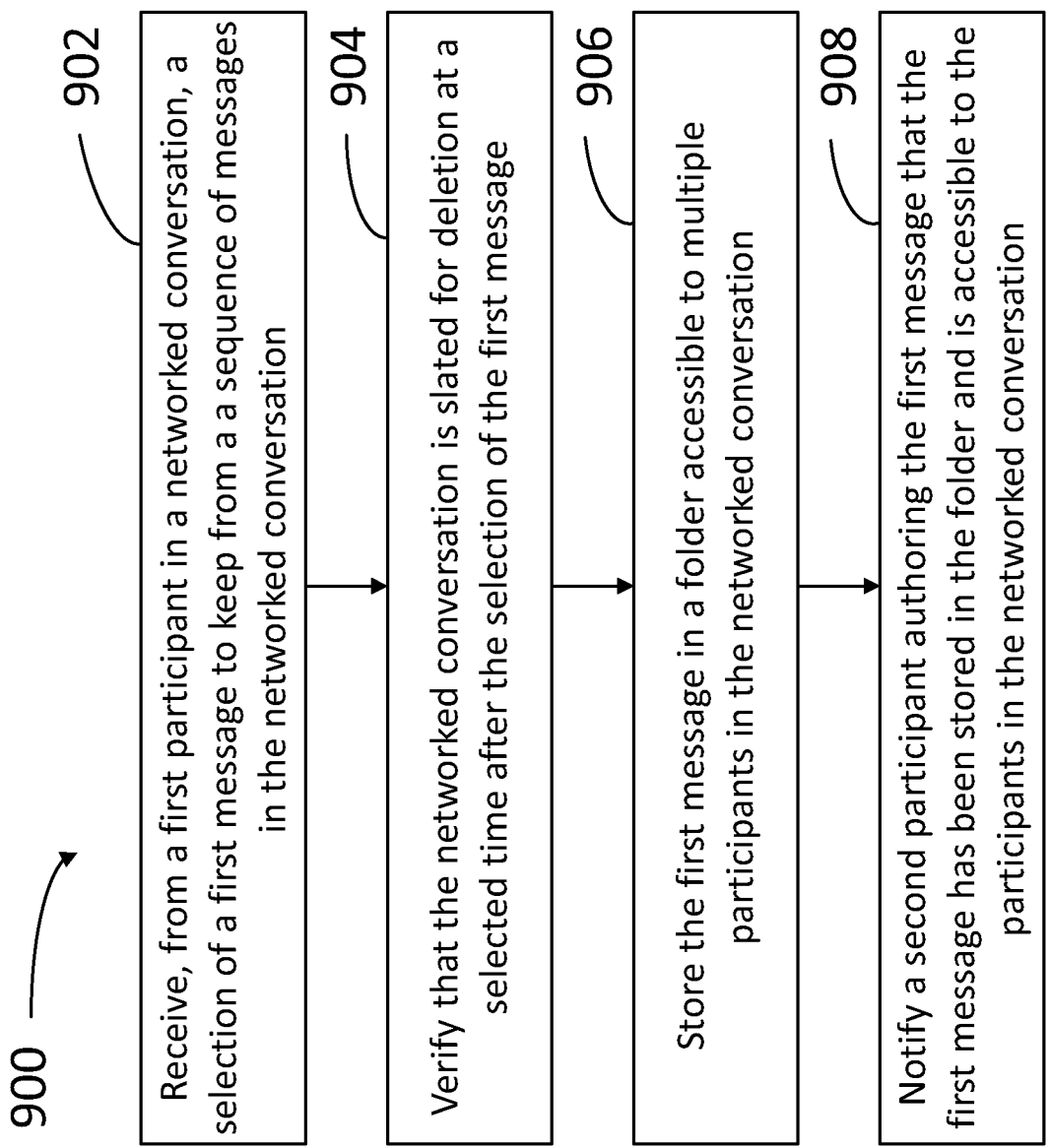
FIG. 9 is a flowchart illustrating steps in a method to keep selected messages in a networked conversation thread, according to some embodiments.

FIG. 9 is a flowchart illustrating steps in a method 900 to keep selected messages in a networked conversation thread, according to some embodiments. In some embodiments, methods as disclosed herein may include one or more steps in method 900 performed by a processor circuit executing instructions stored in a memory circuit, in a client device, a remote server or a database, communicatively coupled through a network (e.g., processors 212, memories 220, client device 110, server 130, databases 152 and 252, and network 150). In some embodiments, one or more of the steps in method 900 may be performed by a chat engine including a messaging tool, a synchronization tool, a file management tool and a search tool, as disclosed herein (e.g., chat engine 232, messaging tool 242, synchronization tool 244, file management tool 246, and search tool 248). In some embodiments, methods consistent with the present disclosure may include at least one or more steps as in method 900 performed in a different order, simultaneously, quasi-simultaneously or overlapping in time.

Step 902 includes receiving, from a first participant in a networked conversation, a selection of a first message to keep from a sequence of messages in the networked conversation. In some embodiments, step 902 includes receiving a selection of multiple messages to keep from the networked conversation. In some embodiments, step 902 includes allowing an administrator of the networked conversation to stop receiving a further selection of a second message to keep.

Step 904 includes verifying that the networked conversation is slated for deletion at a selected time after the selection of the first message. In some embodiments, step 904 includes notifying the first participant that the first message has been deleted when the selection for the first message is received after the selected time.

Step 906 includes storing the first message in a folder accessible to multiple participants in the networked conversation. In some embodiments, step 906 includes listing a sender of the first message, and a requester for keeping the first message.

Step 908 includes notifying a second participant authoring the first message that the first message has been stored in the folder and is accessible to the participants in the networked conversation. In some embodiments, step 908 includes notifying the second participant that the first message has been stored in the folder upon selection by the first participant. In some embodiments, step 908 includes allowing the second participant authoring the first message to un-keep the first message. In some embodiments, step 908 includes removing the first message from the folder upon receipt, from the second participant authoring the first message, of a request to de-select the first message; and notifying the participants in the networked conversation that the first message was removed from the folder upon request by the second participant authoring the first message. In some embodiments, step 908 includes providing a filtered folder that includes the first message, to the second participant as a sender of the first message. In some embodiments, step 908 includes providing a tutorial message about a kept message when the second participant is a first-time user of a slate for deletion feature in the networked conversation.

Figure 10:
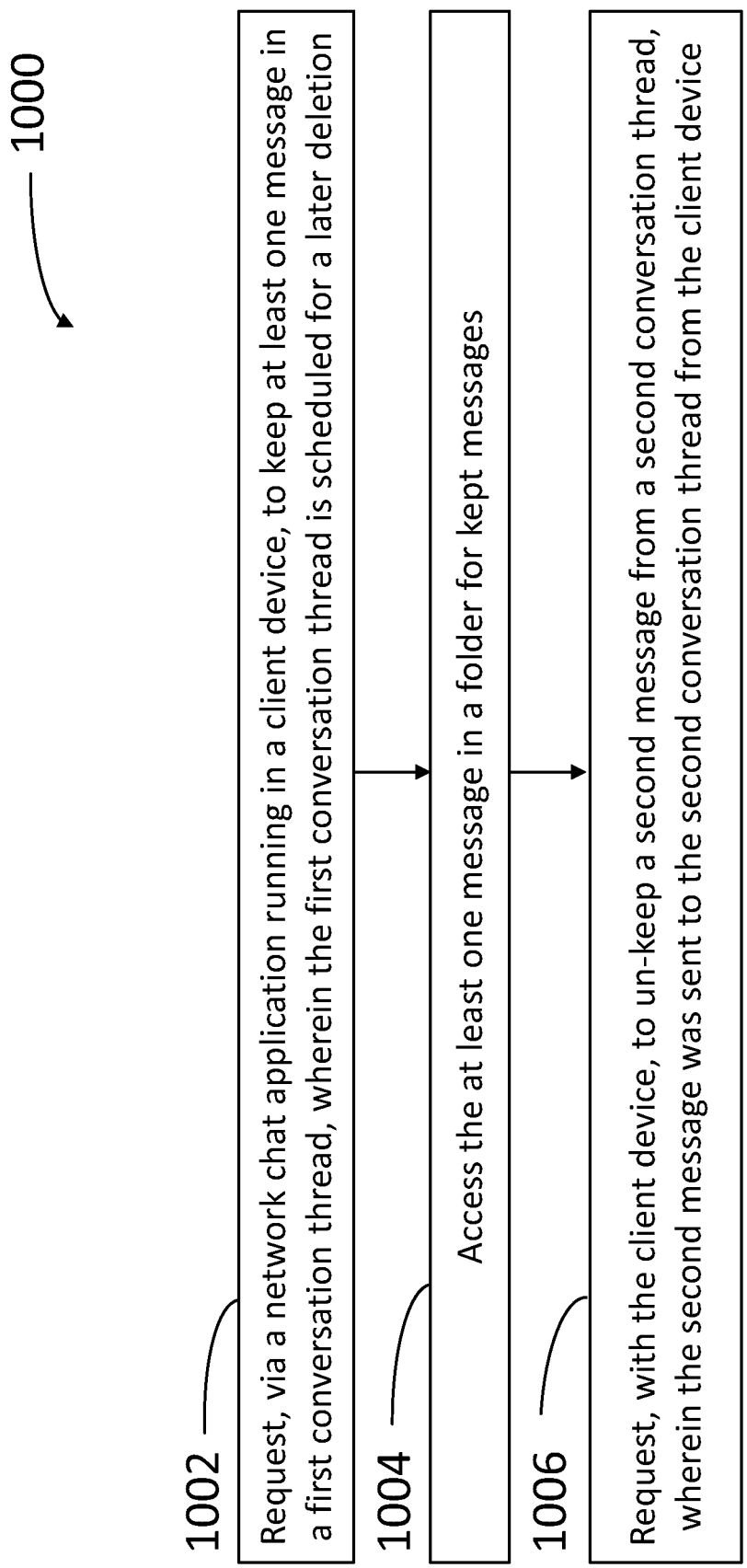
FIG. 10 is a flowchart illustrating steps in a method for managing a networked conversation thread, according to some embodiments.

FIG. 10 is a flowchart illustrating steps in a method 1000 for managing a networked conversation thread, according to some embodiments. In some embodiments, methods as disclosed herein may include one or more steps in method 1000 performed by a processor circuit executing instructions stored in a memory circuit, in a client device, a remote server or a database, communicatively coupled through a network (e.g., processors 212, memories 220, client device 110, server 130, databases 152 and 252, and network 150). In some embodiments, one or more of the steps in method 1000 may be performed by a chat engine including a messaging tool, a synchronization tool, a file management tool and a search tool, as disclosed herein (e.g., chat engine 232, messaging tool 242, synchronization tool 244, file management tool 246, and search tool 248). In some embodiments, methods consistent with the present disclosure may include at least one or more steps as in method 1000 performed in a different order, simultaneously, quasi-simultaneously or overlapping in time.

Step 1002 includes requesting, via a network chat application running in a client device, to keep at least one message in a first conversation thread, wherein the first conversation thread is scheduled for a later deletion. In some embodiments, step 1002 includes selecting multiple messages to keep in the first conversation thread. In some embodiments, step 1002 includes requesting to keep a multimedia file shared in the first conversation thread.

Step 1004 includes accessing the at least one message in a folder for kept messages. In some embodiments, step 1004 includes receiving, from a server hosting the network chat application, a message alerting that the second message will be instantly deleted because the second conversation thread has expired.

Step 1006 includes requesting, with the client device, to un-keep a second message from a second conversation thread, wherein the second message was sent to the second conversation thread from the client device. In some embodiments, step 1006 includes accessing for search, with the client device, a folder storing multiple kept messages in multiple conversation threads in which the client device has participated.

Hardware Overview

Figure 11:
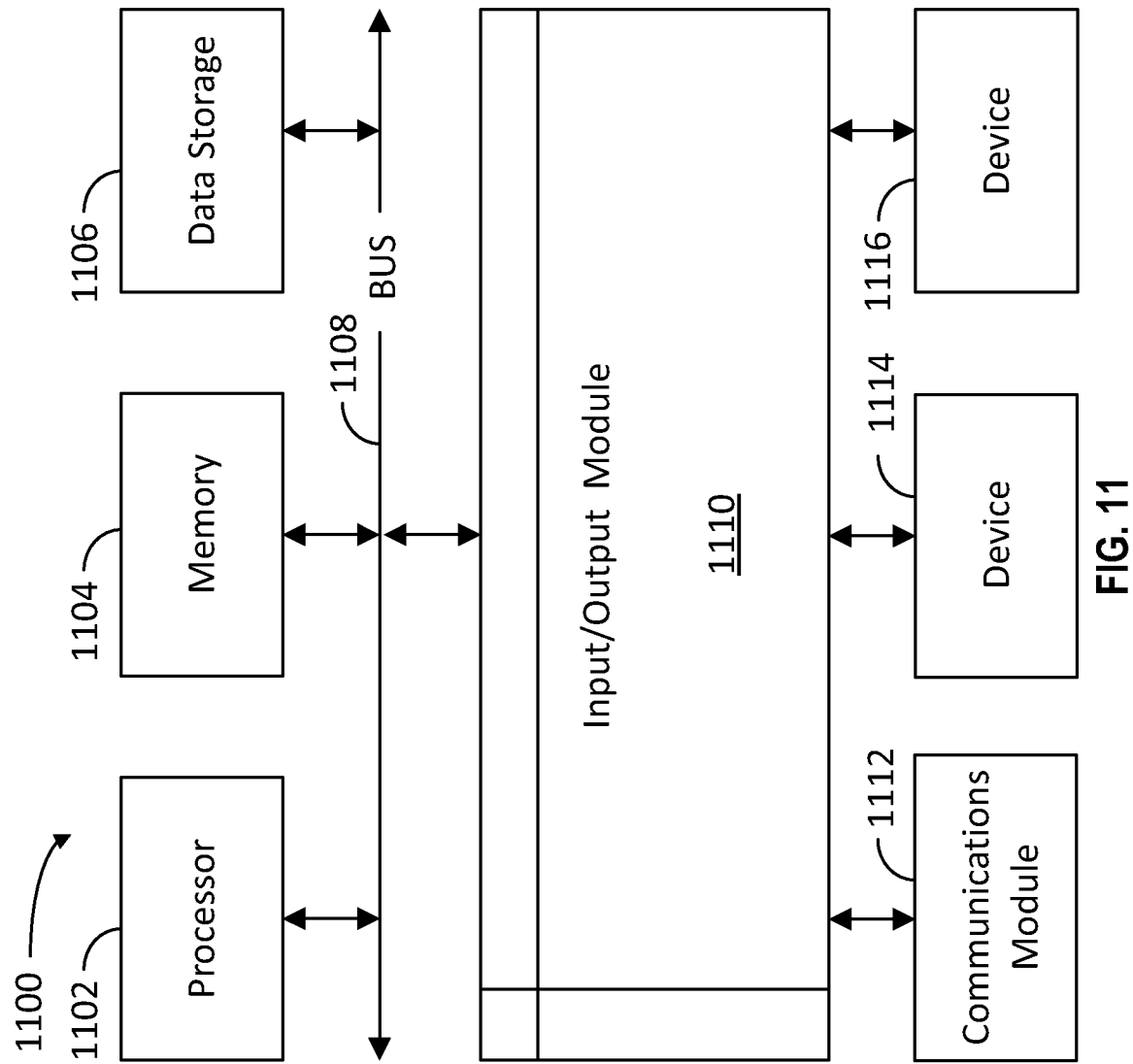
FIG. 11 is a block diagram illustrating a computer system used to at least partially carry out one or more of the steps in methods disclosed herein, according to some embodiments.

FIG. 11 is a block diagram illustrating an exemplary computer system 1100 with which the client and server of FIGS. 1 and 2, and methods of 900 and 1000 can be implemented. In certain aspects, the computer system 1100 may be implemented using hardware or a combination of software and hardware, either in a dedicated server, or integrated into another entity, or distributed across multiple entities.

Computer system 1100 (e.g., client 110 and server 130) includes a bus 1108 or other communication mechanism for communicating information, and a processor 1102 (e.g., processors 212) coupled with bus 1108 for processing information. By way of example, the computer system 1100 may be implemented with one or more processors 1102. Processor 1102 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 1100 can include, in addition to hardware, code that creates an execution environment for the computer program in question, e.g., code that constitutes processor firmware, a protocol stack, a database management system, an operating system, or a combination of one or more of them stored in an included memory 1104 (e.g., memories 220), such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 1108 for storing information and instructions to be executed by processor 1102. The processor 1102 and the memory 1104 can be supplemented by, or incorporated in, special purpose logic circuitry.

The instructions may be stored in the memory 1104 and implemented in one or more computer program products, e.g., one or more modules of computer program instructions encoded on a computer-readable medium for execution by, or to control the operation of, the computer system 1100, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 1104 may also be used for storing temporary variable or other intermediate information during execution of instructions to be executed by processor 1102.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 1100 further includes a data storage device 1106 such as a magnetic disk or optical disk, coupled to bus 1108 for storing information and instructions. Computer system 1100 may be coupled via input/output module 1110 to various devices. Input/output module 1110 can be any input/output module. Exemplary input/output modules 1110 include data ports such as USB ports. The input/output module 1110 is configured to connect to a communications module 1112. Exemplary communications modules 1112 (e.g., communications modules 218) include networking interface cards, such as Ethernet cards and modems. In certain aspects, input/output module 1110 is configured to connect to a plurality of devices, such as an input device 1114 (e.g., input device 214) and/or an output device 1116 (e.g., output device 216). Exemplary input devices 1114 include a keyboard and a pointing device, e.g., a mouse or a trackball, by which a user can provide input to the computer system 1100. Other kinds of input devices 1114 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 1116 include display devices, such as an LCD (liquid crystal display) monitor, for displaying information to the user.

According to one aspect of the present disclosure, the client 110 and server 130 can be implemented using a computer system 1100 in response to processor 1102 executing one or more sequences of one or more instructions contained in memory 1104. Such instructions may be read into memory 1104 from another machine-readable medium, such as data storage device 1106.

Execution of the sequences of instructions contained in main memory 1104 causes processor 1102 to perform the process steps described herein. One or more processors in a multi-processing arrangement may also be employed to execute the sequences of instructions contained in memory 1104. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back-end component, e.g., a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. The communication network (e.g., network 150) can include, for example, any one or more of a LAN, a WAN, the Internet, and the like. Further, the communication network can include, but is not limited to, for example, any one or more of the following tool topologies, including a bus network, a star network, a ring network, a mesh network, a star-bus network, tree or hierarchical network, or the like. The communications modules can be, for example, modems or Ethernet cards.

Computer system 1100 can include clients and servers. A client and server are generally remote from each other and typically interact through a communication network. The relationship of client and server arises by virtue of computer programs running on the respective computers and having a client-server relationship to each other. Computer system 1100 can be, for example, and without limitation, a desktop computer, laptop computer, or tablet computer. Computer system 1100 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 1102 for execution. Such a medium may take many forms, including, but not limited to, non-volatile media, volatile media, and transmission media. Non-volatile media include, for example, optical or magnetic disks, such as data storage device 1106. Volatile media include dynamic memory, such as memory 1104. Transmission media include coaxial cables, copper wire, and fiber optics, including the wires forming bus 1108. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter affecting a machine-readable propagated signal, or a combination of one or more of them.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No clause element is to be construed under the provisions of 35 U.S.C. § 112, sixth paragraph, unless the element is expressly recited using the phrase "means for" or, in the case of a method clause, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method, comprising:
receiving, by a chat application running on a first client device, a selection of a first message to keep from a sequence of messages in Mena networked conversation hosted by the chat application, wherein the first message is associated with a second client device;
verifying that the networked conversation is slated for deletion at a selected time after the selection of the first message;
storing the first message in a folder accessible to multiple participants in the networked conversation;
determining a state of the chat application in the second client device;
displaying, based on the state of the chat application in the second client device, an in-application notification or a push notification that the first message has been stored in the folder and is accessible to the participants in the networked conversation; and
removing the first message from the folder upon receipt, from the second client device, of a request to un-keep the first message.

2. The computer-implemented method of claim 1, wherein receiving the selection of the first message to keep comprises receiving a selection of multiple messages to keep from the networked conversation.

3. The computer-implemented method of claim 1, further comprising allowing the second client device to send the request to un-keep the first message.

4. The computer-implemented method of claim 1, further comprising notifying the multiple participants in the networked conversation that the first message was removed from the folder upon the request from the second client device.

5. The computer-implemented method of claim 1, further comprising allowing an administrator of the networked conversation to stop receiving a further selection of a second message to keep.

6. The computer-implemented method of claim 1, wherein verifying that the networked conversation is slated for deletion at the selected time after the selection of the first message includes displaying a notification that the first message has been deleted when the selection for the first message is received after the selected time.

7. The computer-implemented method of claim 1, wherein storing the first message in the folder accessible to the multiple participants in the networked conversation comprises listing a sender of the first message and a requester for keeping the first message.

8. The computer-implemented method of claim 1, further comprising providing a filtered folder that includes the first message, to the second client device.

9. The computer-implemented method of claim 1, further comprising providing a tutorial message about a kept message when a participant in the networked conversation is a first-time user of a slate-for-deletion feature in the networked conversation.

10. The computer-implemented method of claim 1, wherein displaying the in-application notification or the push notification that the first message has been stored in the folder comprises displaying the in-application notification or the push notification in the second client device that the first message has been stored in the folder upon the selection from the first client device.

11. A system, comprising:
one or more processors; and
a memory storing instructions which, when executed by the one or more processors, cause the system to:
receive, by a chat application running on a first client device, a selection of a first message to keep from a sequence of messages in a networked conversation hosted by the chat application, wherein the first message is associated with a second client device;
verify that the networked conversation is slated for deletion at a selected time after the selection of the first message;
store the first message in a folder accessible to multiple participants in the networked conversation;
determine a state of the chat application in the second client device;
display, based on the state of the chat application in the second client device, an in-application notification or a push notification that the first message has been stored in the folder and is accessible to the participants in the networked conversation; and
remove the first message from the folder upon receipt, from the second client device, of a request to un-keep the first message.

12. The system of claim 11, wherein to receive the selection of the first message to keep, the one or more processors execute instructions to receive a selection of multiple messages to keep from the networked conversation.

13. The system of claim 11, wherein the one or more processors further execute instructions to allow the second client device to send the request to un-keep the first message.

14. The system of claim 11, wherein the one or more processors further execute instructions to notify the multiple participants in the networked conversation that the first message was removed from the folder upon the request from the second client device.

15. The system of claim 11, wherein the one or more processors further execute instructions to allow an administrator of the networked conversation to stop receiving a further selection of a second message to keep.

16. A computer-implemented method, comprising:
requesting, via a network chat application running in a first client device, to keep at least one message in a first conversation thread in a networked conversation hosted by the network chat application, wherein the first conversation thread is scheduled for a later deletion and wherein the at least one message is associated with a second client device;
accessing the at least one message in a folder for kept messages;
determining a state of the chat application in the second client device;

displaying, based on the state of the chat application in the second client device, an in-application notification or a push notification that the at least one message has been stored in the folder and is accessible to multiple participants in the networked conversation;

removing the at least one message from the folder upon receipt, from the second client device, of a request to un-keep the at least one message; and requesting, with the first client device, to un-keep a second message from a second conversation thread, wherein the second message was sent to the second conversation thread from the first client device.

17. The computer-implemented method of claim 16, wherein requesting to keep the at least one message in the first conversation thread comprises selecting multiple messages to keep in the first conversation thread.

18. The computer-implemented method of claim 16, further comprising requesting to keep a multimedia file shared in the first conversation thread.

19. The computer-implemented method of claim 16, further comprising receiving, from a server hosting the network chat application, a message alerting that the second message will be instantly deleted because the second conversation thread has expired.

20. The computer-implemented method of claim 16, further comprising accessing for search, with the first client device, a folder storing multiple kept messages in multiple conversation threads in which the first client device has participated.

\* \* \* \* \*